United States Patent [19]
Allen

[11] 3,746,353
[45] July 17, 1973

[54] COLLET CHUCK ADAPTER
[75] Inventor: Flateau Allen, Parchment, Mich.
[73] Assignee: Kalamazoo Industries, Inc., Kalamazoo, Mich.
[22] Filed: Aug. 30, 1971
[21] Appl. No.: 175,993

[52] U.S. Cl. .................................. 279/51, 279/1 A
[51] Int. Cl. ............................................ B23b 31/20
[58] Field of Search .................. 279/51, 47, 50, 46, 279/41, 42, 43, 1 A, 1 F

[56] References Cited
UNITED STATES PATENTS
2,360,908  10/1944  Stoner.............................. 279/51
2,580,067  12/1951  Barnes.............................. 279/51

*Primary Examiner*—Gil Weidenfeld
*Attorney*—Woodhams, Blanchard and Flynn

[57] ABSTRACT

A collet chuck adapter having a hollow cylindrical body adapted to be carried by supporting means, such as a radial jaw chuck, with the forward end of the adapter extending from the supporting means. A collet mounting ring is carried for limited axial movement within the hollow body, a collet being supported thereon and extending forwardly therefrom through the forward end of the body. A cam ring is loosely radially supported within the forward end of the body. Means accessable from the exterior of the body forwardly of the supporting means are provided for radially shifting the cam ring with respect to the body. A collet engaging ring is fixed to the forward end of the body, axially retains the cam ring therewithin and has a rearwardly tapering opening through which a tapered nose portion of the collet extends, an intermediate portion of the collet extending loosely through the cam ring. The rearward face of the cam ring includes an opposed pair of ramps sloped with respect to the radial plane of the cam ring. A spaced pair of actuating rods extend axially but noncentrally through the body between respective ramp surfaces of the cam ring and the collet mounting ring. As a result, radial adjustment of the cam ring causes, through said ramp surfaces and actuating rods, a corresponding axial movement of the collet mounting ring for tightening the collet on a workpiece.

10 Claims, 10 Drawing Figures

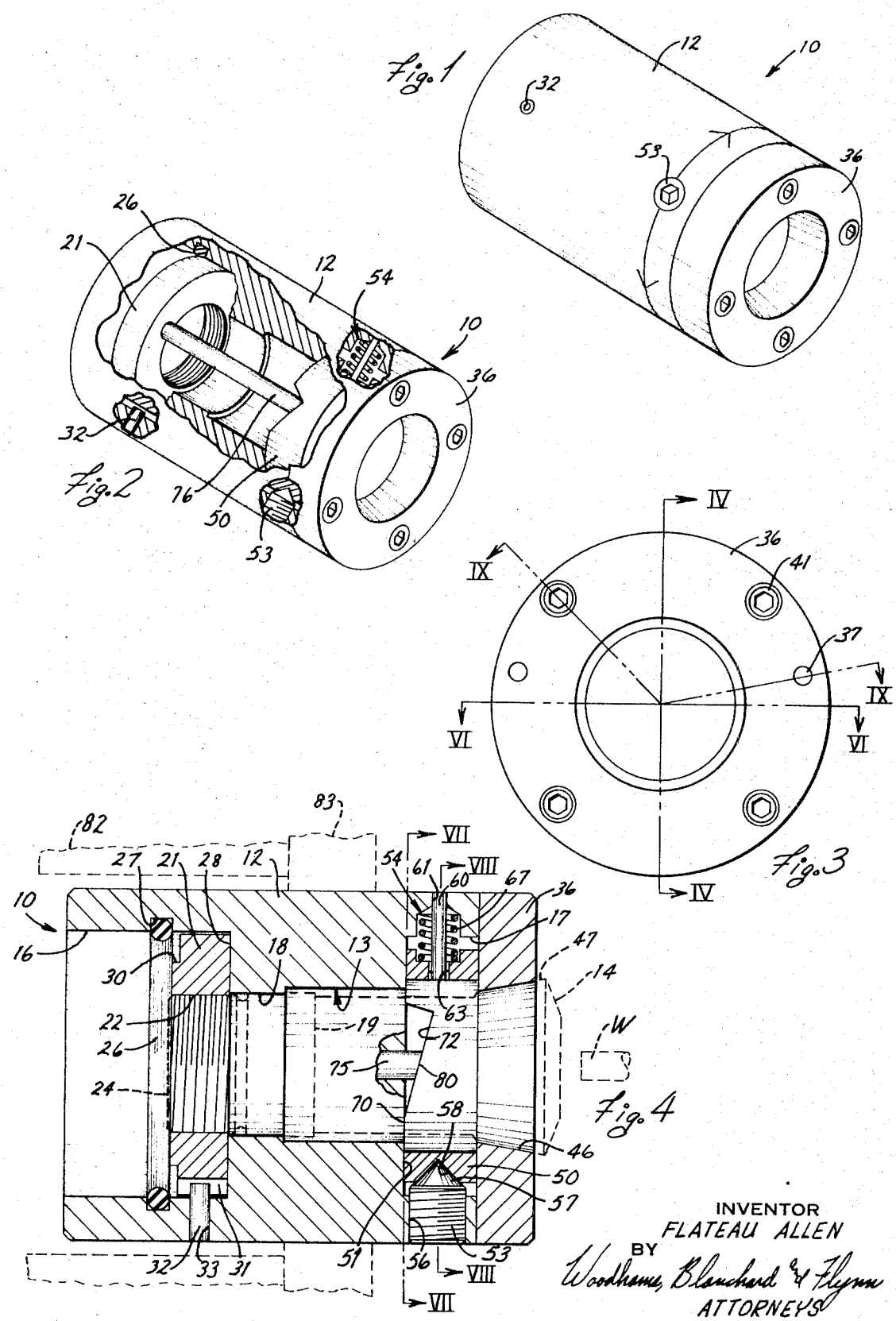

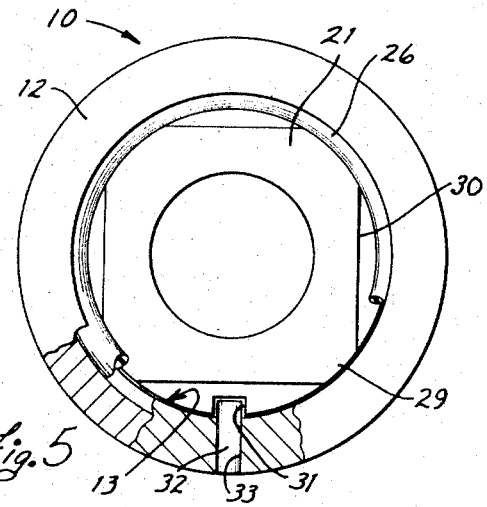
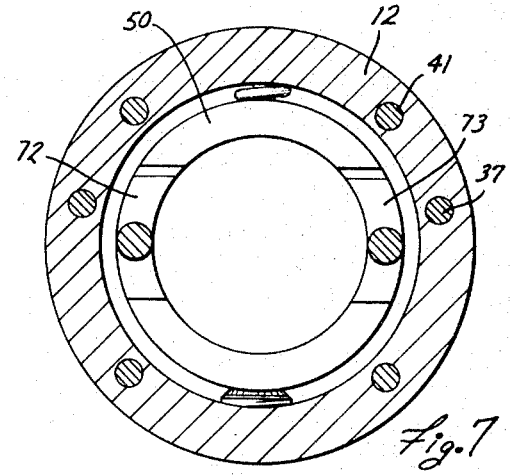
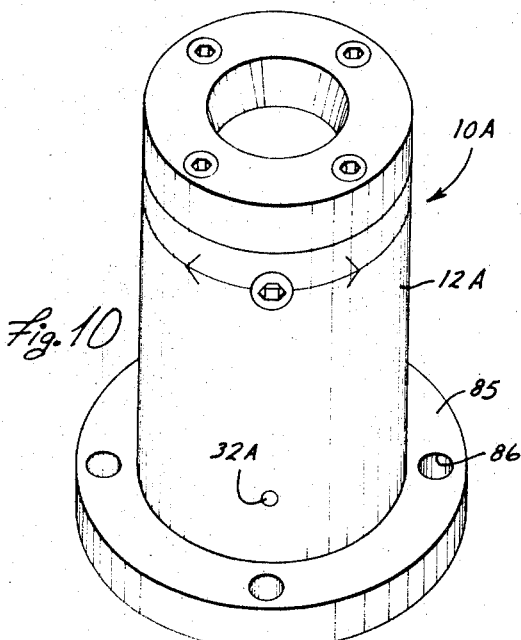
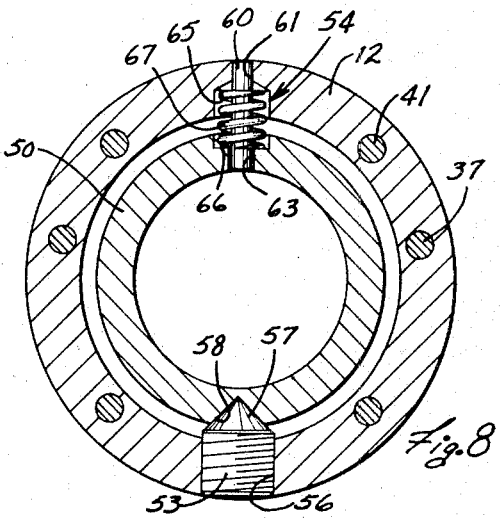
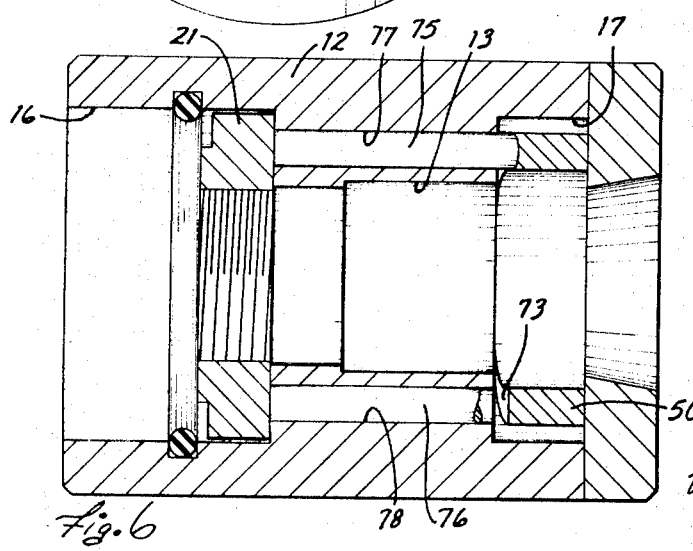
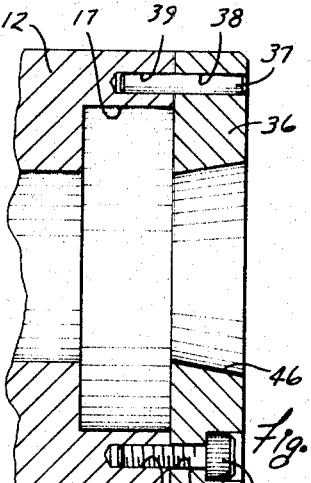

COLLET CHUCK ADAPTER

FIELD OF THE INVENTION

This invention relates to a collet chuck adapter and more particularly relates to a collet chuck adapter arranged for supporting a collet chuck on supporting means such as a radial jaw chuck and including means accessable from the front of the supporting means for tightening and loosening the collet chuck.

BACKGROUND OF THE INVENTION

Collet chucks have long been used for supporting, either fixedly or for rotation, workpieces and tools, such as drills. Prior collet chuck constructions have normally included an inner collet member with a radially slotted head having a central opening for receiving the shank of a workpiece or the like, the inner collet member being telescoped within a hollow holder wherein the collet member head and surrounding holder have interacting tapered surfaces. Thus, relative axial motion between the holder and the collet member in the proper direction causes the collet head to contract and securely hold the workpiece or the like disposed therewithin.

When the collet is to be mounted for rotation, as for example on a lathe, it is often desirable to support the holder between the jaws of a conventional radial jaw chuck. Such is highly desirable where the lathe is used for machining workpieces of widely varying size, in some instances requiring the use of a conventional radial jaw chuck and in other instances requiring the use of a collet chuck, since the radial jaw chuck need not be removed from the lathe when a collet chuck is required. More particularly, in many instances the radial jaw chuck is large and heavy so that removal thereof from and replacement thereof on the lathe is a cumbersome and time-consuming chore.

However, no fully satisfactory collet chuck holder or adapter, of a type adapted to be mounted or held by a conventional radial jaw chuck, is known.

For example, it is known to actuate a collet by means extending rearwardly from the collet, that is, in a direction axially away from the workpiece. However, when the collet holder is mounted between the jaws of the conventional radial jaw chuck on a lathe, such actuating means are not accessable from the front or workpiece end of the collet but rather are hidden within the radial jaw chuck and lathe headstock. Thus, means are required to extend the actuating mechanism rearwardly and through the headstock for actuation on the side of the headstock opposite the workpiece. This also requires the lathe to have a hollow chuck supporting shaft of suitable internal dimensions for receiving such actuating mechanism. In consequence, relatively complex collet and holder constructions have generally resulted. Moreover, since the collet actuating means is normally accessable not from the workpiece end of the collet but rather from a location spaced therefrom by the headstock, such actuating means are relatively inaccessable and thus inconvenient for the lathe operator to use. Thus, prior devices of this type have not been fully satisfactory, particularly in their complexity, consequent cost, the necessity of portions of the equipment to be located on both sides of the headstock of the lathe and the relative inconvenience caused by the location of control means for the chuck at a distance well spaced from the workpiece carried thereby.

Accordingly, the objects of this invention include provision of:

1. A collet chuck holder or adapter capable of supporting a collet chuck member fixedly or for rotation or other movement and including means for tightening and loosening the collet member with respect to a workpiece or the like carried thereby.

2. A collet chuck adapter, as aforesaid, which may itself be supported in any of a variety of ways and is particularly adapted for being supported by a conventional chuck, such as a radial jaw chuck.

3. A collet chuck adapter, as aforesaid, in which means are provided for tightening the collet member and such means are disposed substantially completely within the confines of the adapter and are accessible from the front of the adapter when the adapter is gripped by a conventional radial jaw chuck.

4. A collet chuck adapter, as aforesaid, which may be carried by a conventional radial jaw chuck on a lathe without the necessity of providing a hollow lathe headshaft or such a hollow shaft of particular internal dimensions, and wherein none of the actuating mechanism for the collet member need extend through the headstock of the lathe to the end thereof remote from the workpiece.

5. A collet chuck adapter, as aforesaid, in which the means for tightening the collet member on the workpiece is of simplified construction, utilizing a minimum of parts, and wherein the necessity for parts having critical tolerances is eliminated.

6. A collet chuck adapter, as aforesaid, in which relative axial motion is employed between the centrally located collet member and a surrounding body to tighten the collet member but wherein such relative axial motion is initiated by an initial transverse or radial motion of a part of the adapter.

7. A collet chuck adapter, as aforesaid, employing a simplified means for promoting relative axial motion between the collet member and the surrounding body in loosening the collet.

8. A collet chuck adapter, as aforesaid, which, despite relative transverse motion between parts thereof during tightening of the collet, has been found free of significant vibration during high speed rotation.

9. A collet chuck adapter, as aforesaid, which can be quickly and readily assembled and disassembled, which may be constructed from commonly available materials and parts, which may be used to support and adjust collet members of a variety of sizes with little or no modification, which is readily constructed with commonly available machine tools, has few parts and may be inexpensively manufactured in large or small quantities.

10. A collet chuck adapter, as aforesaid, which is durable and capable of prolonged use under adverse conditions with little or no maintenance.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a pictorial view of a collet chuck adapter embodying the present invention.

FIG. 2 is a partially broken pictorial view of the embodiment of FIG. 1 rotated through 90° about its length axis.

FIG. 3 is an enlarged front end view of the adapter of FIG. 1.

FIG. 4 is a partially broken central cross sectional view substantially taken on the line IV—IV of FIG. 3 and showing a collet member and fragments of a radial jaw chuck in broken lines.

FIG. 5 is a partially broken rear end view of the adapter of FIG. 4.

FIG. 6 is a partially broken central cross sectional view substantially as taken on the line VI—VI of FIG. 3.

FIG. 7 is a cross sectional view substantially as taken on the line VII—VII of FIG. 4.

FIG. 8 is a cross sectional view substantially as taken on the line VIII—VIII of FIG. 4.

FIG. 9 is a fragmentary cross sectional view substantially as taken on the line IX—IX of FIG. 3.

FIG. 10 is a pictorial view of a modification.

Certain terminology will be used in the following description for convenience in reference only and will not be limiting. The words "up", "down", "right" and "left" will designate directions in the drawings to which reference is made. The words "front" and "rear" will refer to the rightward and leftward ends respectively of the embodiment as shown in FIG. 4. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a collet chuck adapter having a hollow cylindrical body adapted to be carried by supporting means, such as a radial jaw chuck, with the forward end of the adapter extending from the supporting means. A collet mounting ring is carried for limited axial movement within the hollow body, a collet being supported thereon and extending forwardly therefrom through the forward end of the body. A cam ring is loosely radially supported within the forward end of the body. Means accessable from the exterior of the body forwardly of the supporting means are provided for radially shifting the cam ring with respect to the body. A collet engaging ring is fixed to the forward end of the body, axially retains the cam ring therewithin and has a rearwardly tapering opening through which a tapered nose portion of the collet extends, an intermediate portion of the collet extending loosely through the cam ring. The rearward face of the cam ring includes an opposed pair of ramps sloped with respect to the radial plane of the cam ring. A spaced pair of actuating rods extending axially but noncentrally through the body between respective ramp surfaces of the cam ring and the collet mounting ring. As a result, radial adjustment of the cam ring causes, through said ramp surfaces and actuating rods, a corresponding axial movement of the collet mounting ring for tightening the collet on a workpiece.

DETAILED DESCRIPTION

The collet chuck adapter 10 disclosed in FIGS. 1–9 is a preferred embodiment of the invention and includes a hollow, preferably circularly cylindrical body 12 (FIG. 4). The body 12 has a central opening 13 therethrough. The central opening 13 is adapted to receive therein a conventional collet member indicated at 14 in broken lines. Preferably circular cylindrical recesses 16 and 17 are provided in the rearward (leftward) and forward (rightward) ends of the body 12 and communicate coaxially with the central opening 13. The rearward recess 16 is preferably of greater axial extent than the forward recess 17. In the particular embodiment shown, the portion of the central opening 13 communicating with the rearward recess 16 is stepped radially inwardly as indicated at 18 and defines a pilot opening for snugly but slideably receiving a cylindrical pilot portion 19 on the collet member 14.

A preferably circularly cylindrical collet mounting ring 21 is radially loosely receivable within the rearward recess 16 and has a threaded central opening 22 for securement to the threaded rearward end 24 of the collet member 14.

Means are provided for allowing limited, resiliently resisted, axial movement of the collet mounting ring 21, such means in the preferred embodiment shown comprising a resilient O-ring 26 located against axial movement in an annular groove 27 in the peripheral wall of the recess 16. The groove 27 is spaced from the end face 28 of the recess 16 substantially by the axial thickness of the ring 21. The O-ring 26 radially overlaps the collet mounting ring 21 and limits rearward movement thereof. Although the collet mounting ring is snugly axially received between the O-ring 26 and the end wall 28 of the recess 16, the resilience of the O-ring 26 allows limited axial movement of the ring 21 and, hence, of the collet member 14.

Although the O-ring 26 has been disclosed as the means for resiliently backing the collet mounting ring 21, it is contemplated that other resilient means may be employed for this purpose including, for example, an annular spring of wavy circumferential configuration, such as a Belleville spring.

It has been found that with conventional O-ring materials that it is desirable to provide means for increasing the axial movement of the collet mounting ring 21 somewhat beyond that which would be ordinarily allowed by a full circumferential contact between the rings 21 and 26. This is preferably accomplished by recessing the rearward radial face of the collet mounting ring 21 at several chordal zones along its periphery, leaving a plurality, here four, of evenly spaced, circumferentially narrow, abutment faces 29 which provide a substantially reduced contact area between the rings 21 and 26, increase the contact pressure therebetween when the collet mounting ring 21 is urged rearwardly of the body 12 and thus allow an increase in the rearward travel of the collet mounting ring 21.

An axially extending groove 31 (FIGS. 4 and 5) is provided in the periphery of the collet mounting ring 21. A pin 32 extends through and is preferably press fitted within a radial opening 33 which extends through the body 12 into the rearward recess 16. The pin 32 is received within the groove 31 for preventing unintended rotation of the collet mounting ring 21 with respect to the body 12.

An annular forward retainer plate or collet actuating ring 36 is removably fixed to the forward end of the body 12 by any suitable means. In the particular embodiment shown, such means include a pair of locator pins 37 (FIGS. 3 and 9) which extend through holes 38 in the collet actuating ring 36 and into blind holes 39 in the forward end wall of the body 12 outboard of the forward recess 17. Such means further include a plurality, here four, of evenly circumferentially spaced screws. The screws 41 extend axially rearwardly through countersunk holes 32 in the collet actuating ring 36 and threadedly engage blind holes 43 in the forward face of the body 12 outboard of the forward recess 17 thereof. Thus, the collet acutating ring 36 is accurately coaxially located on the body 12 by the locator pins 37 and is removably fixed thereto by the screws 41.

The collet actuating ring 36 (FIG. 4) is provided with a frustoconical central opening 46 which diverges forwardly at an angle of taper corresponding to the angle of taper of the peripheral wall of the head 47 of the collet member 14 and is adapted to receive said head 47 therein. In consequence, rearward axial movement of the collet member 14 causes contraction of the bore (not shown) of the collet member 14 for firmly gripping a workpiece or the like, indicated in broken lines at W.

A cam ring 50 (FIGS. 4, 7 and 8) is loosely radially set within the forward recess 17 of the body 12. The cam ring 50 in the particular embodiment shown has a diameter which is about one quarter of an inch less than the inside diameter of the recess 17 and is snugly but radially movably fitted between the collet actuating ring 36 and the end wall 51 of the recess 17. The cam ring 50 may be moved radially with respect to the body 12 from a position coaxial with the body 12 to positions nonconcentric therewith. The inside diameter of the cam ring 50 preferably exceeds the opposed outside diameter of the collet member by a substantial amount so as to allow movement of the cam ring radially of the body 12 to a position adjacent or in contact with the peripheral wall of the recess 17.

Means are provided for accurately changing the radial location of the cam ring 50 and for holding the cam ring in a desired radial location with respect to the body 12, such means including a manually actuable locating member 53 and a biasing unit 54 (FIGS. 4 and 8).

In the particular embodiment shown, the locating member 53 comprises a set screw of substantial diameter which is threadeable through a radial opening 56 in the peripheral wall of the body 12 into the recess 17. The set screw 53 is provided with a conical inner end 57 engageable within a conical recess 58 in the peripheral wall of the cam ring 50.

The biasing unit 54 is preferably diametrically opposed to the set screw 53 for urging the cam ring 50 diametrically against the conical end 57 of the set screw 53. In the preferred embodiment shown, the biasing unit 54 comprises a pin, preferably a roll pin, 60 which extends through a hole 61 in the peripheral wall of the body 12 preferably diametrically opposed to the threaded opening 56. The hole 61 is sized to snugly receive the roll pin 60 therethrough so as to fixedly though removably locate the roll pin 60 with respect to the body 12. The pin 60 is snugly but slideably received within a radial opening 63 in the cam ring 50. The opening 63 and conical recess 50 are preferably diametrically opposed. Opposed and radially enlarged recesses 65 and 66 are provided in the opposed outer and inner surfaces of the cam ring 50 and recess 17, respectively, in coaxial relationship with the opening 63 and hole 61. A spiral compression spring 67 loosely surrounds the pin 60, the opposite ends of the spring being received in the recesses 65 and 66 for urging the cam ring 50 snugly against the inner end 57 of the set screw 53.

The rearward face 70 of the cam ring 50 is provided with a pair of substantially rearwardly facing but somewhat forwardly inclined ramp faces 72 and 73 (FIGS. 4, 6 and 7). Ramp faces 72 and 73 may be formed in the cam ring 50 by any conventional means such as by milling. The ramp faces 72 and 73 are preferably coplanar. The plane of the ramp faces 72 and 73 is in the particular embodiment shown at an angle of 15° to a radial plane of the cam ring 50 and body 12 although it is contemplated that ramp angles in the range of 5°-40° may be employed. In the particular embodiment shown, the cam ring is about 2 inches in diameter and the length of the ramp 72 and 73 is approximately three-quarters of an inch. The mid-points of the ramps 72 and 73 are preferably diametrically opposed.

A pair of cylindrical, preferably identical, actuating rods 75 and 76 (FIG. 6) are snugly but slideably received in respective parallel openings 77 and 78 which extend between and communicate with the rearward and forward recesses 16 and 17, respectively, of the body 12. The openings 77 and 78 are diametrically opposed with respect to the body 12 and equally spaced from the central axis thereof, the openings 77 and 78 lying close to but radially outboard of the central opening 13 of the body 12. The rearward ends of the rods 75 and 76 are preferably substantially radial so as to contact the forward face of the collet mounting ring 21. The forward ends 80 of the rods 75 and 76 are sloped to substantially parallel the ramps 72 and 73. The length of the rods 75 and 76 is preferably chosen so that the forward ends 80 of the rods will contact the rams 72 while the rearward ends of said rods contact the collet mounting ring 21 when the cam ring is somewhat below its centered position of FIG. 4.

OPERATION

To assemble the device 10 preparatory to use, the cam ring 50 is placed in the recess 17 with the ramps 72 and 73 facing rearwardly and substantially centered on the opposed openings 75 and 76 in the body 12 and with the spring 67 in its recesses 65 and 66. The roll pin 60 may then be forced radially inwardly through the hole 61 and into the opening 63 of the cam ring 50. The set screw 53 may then be inserted threadedly into the radial opening 56 of the body 12 so that its conical inner end 57 is received within the conical recess 58 in the cam ring 50 to support same in the body 12. Thereafter, the actuating rods 77 and 76 may be inserted from the rearward end of the body 12 forwardly into their corresponding openings 77 and 78 to bring the forward faces 80 thereof into contact with the ramps 72 and 73, respectively.

Thereafter, the cover plate or collet actuating ring 36 may be installed on the body 12 by means of the guide pins 37 and the screws 41.

The threaded rearward end of the collet member 14 may then be inserted rearwardly through the collet actuating ring 36 and central opening 13 into the rear recess 16 thereof. The collet mounting ring 21 is then moved forwardly into the rear recess 16 of the body 12 and threaded onto the rear end 24 of the collet member 14. Threading of the collet mounting ring 21 on the rearward end 24 of the collet member 14 is assisted by the provision of the step edges 30 on the rearward face of the collet mounting ring 21 which may be engaged by suitable tools such as a wrench or screw driver to facilitate relative rotation of the collet mounting ring 21 and collet member 14.

The resilient element 26 may then be inserted forwardly into the recess 16 until it snaps into the annular groove 27 therein and the pin 32 pressed through the opening 33 into engagement with the groove 31 in the collet mounting ring 21. Thus, the device 10 is completely assembled and contains a collet 14 of desired size.

The device 10 may then be supported for work operations by any convenient means, for example, a radial jaw chuck. Thus, the rearward end of the device 10 may be moved rearwardly into the throat of a suitable radial jaw chuck 82 (indicated in broken lines in FIG. 4), whereafter the jaws 83 of the chuck 82 may be tightened to grip the body 12. The chuck 82 may be of any convenient type, such as that shown in U.S. Pat. No. 2,639,157 to R. E. Buck et al. A substantial portion, here more than half, of the length of the body 12 may be received within the chuck 82 and/or gripped by the jaws 83 thereof so as to very firmly support the device 10 for rotation or other movement. However, when so installed, the set screw 53 is still accessable from in front of the jaw chuck 82 to enable tightening or loosening of the collet.

To chuck a workpiece W or the like in the collet 14, such workpiece W is moved rearwardly into the central opening or throat (not shown) of the collet member 14. To tighten the collet member 14 to firmly grip the workpiece W, the set screw 53 is rotated to cause same to move radially inwardly of the body 12 by a small amount. This moves the cam ring 50 radially and resiliently against the spring 67 to carry the ramp surfaces 72 and 73 upwardly with respect to the abutting ends 80 of the actuating rods 75 and 76. As a result of the slope of the ramps 72 and 73, the actuating rods 75 and 76 are thus moved rearwardly, thereby causing rearward displacement of the collet mounting ring 21, against the resilient resistance of the O-ring 26 in the portions thereof bearing against the several abutment faces 29 of the collet mounting ring 21. In consequence, the collet member 14 is carried rearwardly and the tapered head 47 thereof moves rearwardly along the tapered surface of the central opening 46 of the collet actuating ring 36 so as to reduce the external diameter of the collet head 47 and thereby tighten such collet head upon the workpiece W to firmly grip same.

Collet members usually have a one piece head, the throat of which is only slightly larger than the workpiece to be received therein. Thus, only a relatively small diametral size reduction of the collet head 47 is required to enable same to firmly grip the workpiece W. In consequence, the distances moved by parts of the device 10 to cause such gripping by the collet member 14 need also be only relatively small. More particularly, the radial displacement of the cam ring 50 required to cause the collet member 14 to firmly grip the workpiece W is relatively small, typically in the order of a sixteenth of an inch or less. As a result, even if the cam ring 50 is radially displaced, during tightening of the collet member 14, to a condition noncoaxial with the body 12, the cam ring 50 will be still quite near a position of coaxiality therewith. Further, the mass of the cam ring 50 is relatively small with respect to the mass of the device 10 as a whole, particularly in comparison to the device 10 with the collet 14 and workpiece mounted therein. It has been found in practice that movement of the cam ring 50 to a noncoaxial position with respect to the body 12 in chucking a workpiece W has no noticeable effect on the rotational balance of the device 10 even when the resultant assembly is rotated at high speeds, for example, several thousand rpm.

Although the cam ring 50 may be coaxial with the body 12 when the collet member 14 is in its relaxed or open condition, it is further contemplated that the cam ring 50 may, for example by judicious selection of the length of the actuating rods 75, be located somewhat below such a coaxial position so as to move beyond or into coaxiality with the body 12 on tightening the collet member 14. Also, the weight of the locating member 53 and biasing unit 58 may be selected to compensate for any offset of the center of mass of the cam ring 50 from the axis of the body 12 when the collet member 14 is tightened.

The workpiece W may be released from the collet member 14, the collet member 14 may be removed from the device 10 and the device 10 may be disassembled by a reversal of the above-mentioned assembly and chucking steps.

Although it is preferred that tightening of the collet member 14 be carried out by a radial movement of the cam ring 50, it is contemplated, although believed less desirable that, for example, the diameter of the recess 17 may be reduced to snugly receive the cam ring, the ramps on the rear face of the cam ring 50 may be rearranged to face in the same circumferential direction (rather than opposite circumferential directions as disclosed) and the screw 53 and the biasing unit 54 may be relocated from a radial alignment with respect to the cam ring 50 to a substantially tangential alignment with respect thereto. Thus, tightening of the screw would rotate rather than radially displace the cam ring, such rotation being resisted by the biasing unit and resulting in corresponding axial displacement of the actuating rods and collet member to tighten the latter. However, such modification, while maintaining the cam ring in permanent coaxiality with the body 12, would also substantially complicate the structure and manufacture of the device and for this and other reasons is thus not preferred for most uses.

MODIFICATION

As above-mentioned, the apparatus embodying the invention can be mounted in a variety of ways. Portions of the apparatus in FIG. 10 similar to corresponding portions of the embodiments of FIGS. 1-9 carry the same reference numerals thereas with the suffix A added thereto. FIG. 10 discloses a modified mounting arrangement in which a device 10A incorporating the invention has a body 12A similar to the body 12 of the device of FIGS. 1-9 except that the body 12A is provided with a radial flange 85 located axially beyond the pin 32A. The flange 85 is preferably provided with a plurality of holes 86 capable of receiving suitable screws not shown for mounting the device 10A on a fixed support such as a bench or the like not shown. When so mounted, the device 10A may carry a collet member (not shown) similar to the collet member 14 of FIG. 4 in upstanding relationship thereto for receiving a suitable workpiece, tool or the like, for carrying out machining operations of any desired type. The device 10A may for example, be used as a drill fixture.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A collet chuck adapter for supporting and actuating a collet member, comprising in combination:
   a hollow body adapted for receiving therewithin the collet member;
   first means fixed with respect to said body for tightening said collet member upon axial movement of said collet member with respect thereto;
   second means fixed with respect to said collet member and located within said body for resiliently limited axial movement of said collet member with respect thereto;
   a ramp and ramp supporting means axially located within said body for resiliently opposed movement in a direction having a component parallel to said ramp and means accessable externally of said body for moving said ramp supporting means in such direction;
   motion transfer means disposed between and contacting said ramp and said second means for axially moving said second means in response to movement of said ramp supporting means in said direction;
   whereby such adjustment of said accessable means results in a tightening of said collet member to enable same to grip a workpiece.

2. The device of claim 1 in which said first means comprises a ring having a tapered opening and secured to one end of said hollow body and communicating with the interior thereof, said collet member having a head with a correspondingly tapered peripheral surface, whereby axial motion of said head with respect to said tapered opening results in tightening or loosening of the collet member.

3. The device of claim 1 in which said second means comprises a mounting ring slideably received within said hollow body and fixedly securable to said collet member, said second means further comprising resilient means for resiliently backing said mounting ring with respect to said body and for resiliently limiting axial movement of the mounting ring with respect to the body in a direction corresponding to tightening of said collet member.

4. The device of claim 3 in which said resilient means comprises an elastomeric O-ring seated in an annular groove in the interior of said hollow body on one side of said mounting ring, said hollow body defining a shoulder on the other side of said mounting ring, said mounting ring being snugly sandwiched between said shoulder and said O-ring.

5. The device of claim 4 in which said mounting ring is provided with a radially outwardly opening and axially extending groove in the periphery thereof, said body being provided with a pin extending into said groove for preventing unintended rotation of said mounting ring with respect to said body.

6. The device of claim 4, in which said mounting ring is provided with a plurality of circumferentially spaced, axially arranged portions facing said O-ring for minimizing the area of contact between said mounting ring and said O-ring to reduce the resilient resistance of said O-ring to movement of said mounting ring thereinto.

7. The device of claim 1 in which said ramp supporting means comprises a cam ring located within a chamber within said body in substantially fixed axial relation with said body but for limited radial motion with respect to said body, said cam ring having a pair of said ramps thereon, said ramps being sloped with respect to a radial plane of said cam ring and body and facing said second means, said ramps being substantially coplanar.

8. The device of claim 7 in which said means accessable externally of said body comprises a threaded element radially adjustably supported on said body in radial opposition to said cam ring and having an outer end accessable through an opening to the exterior of said body and an inner end capable of bearing against the periphery of said cam ring for moving same radially of said body upon threaded movement thereof, said ramp supporting means further including a pin substantially diametrically opposed to said threaded means and radially slideably connecting said cam ring and body and means cooperating with said pin and interposed adjacent thereto between said body and said cam ring for resiliently resisting radial movement of said cam ring induced by said threaded means, the axes of said pin and threaded means substantially paralleling the radial component of the length dimension of said ramps, said threaded means and pin being substantially equally circumferentially spaced from each of said ramps.

9. The device of claim 1 in which said motion transfer means comprises a rod axially aligned with said body and slideably carried thereby, said rod extending from said second means to said ramp, the end of said rod adjacent said ramp being sloped to correspond to the slope of said ramp and being adapted to contact said ramp for relative sliding motion therebetween whereby movement of said ramp supporting means in one direction induces relative sliding motion between said ramp and adjacent rod end to move said rod axially of said body away from said ramp whereby said rod causes a corresponding movement of said second means and collet member axially of said body and away from said ramp for tightening said collet member.

10. The device of claim 1 in which said hollow body has a central opening therethrough and radially enlarged front and rear recesses at the ends thereof coaxial with said central opening, said first means comprising a plate secured to the front end of said body, said plate having a central opening therein coaxially aligned with said central opening in said body and tapered to converge rearwardly, said collet member being extendible into said central openings and having a head portion at the forward end thereof with a tapered periphery engageable with a wedging action within said opening in said plate for tightening said collet member upon axial movement thereof, said second means comprising a mounting ring snugly receivable in said rear recess, said mounting ring being internally threaded for fixedly receiving therein the rearward end of the collet member, said second means further comprising a resilient O-ring disposed in a groove in said rearward recess and coacting with the end wall of said rear recess to sandwich said mounting ring therebetween, said mounting ring having rearwardly facing, spaced segments adjacent its periphery engageable with said O-ring for exerting substantial pressures thereon when moved rearwardly with respect thereto, said O-ring thereby resiliently allowing limited rearward movement of the mounting ring and collet member, said second means further including means preventing rotation of said mounting ring, said ramp support means comprising a cam ring held for limited radial movement within said front recess by said plate, said collet member passing loosely through said cam ring, said cam ring having a substantially diametrically, opposed pair of rearwardly facing, coplanar sloped ramps, said ramp supporting means further including guide means diametrically opposed to and cooperating with said externally accessable means for limiting motion of said cam ring in said front recess to a single diametral path substantially co-axial with said guide means, said ramps being evenly circumferentially spaced from said diametral path on opposite sides thereof, said ramp supporting means further including a resilient member associated with said guide means for resiliently resisting movement of said cam ring along said diametral path away from said externally accessable means, said externally accessable means comprising a set screw threadable into said front recess to engage said cam ring., said motion transfer means comprising a diametrically spaced pair of rods extending axially of said body and supported for sliding longitudinal movement in passages of said body outboard of said central oening therein and communicating with said recesses, said rods being engageable with the opposed surfaces of said mounting ring and ramps on said cam ring for causing rearward movement of said mounting ring and collet member with respect to said body upon radial movement of said cam ring along said path in response to threading of said set screw into said body whereby to tighten said collet member.

* * * * *